United States Patent

Pierce et al.

[15] 3,681,418

[45] Aug. 1, 1972

[54] FLUOROALKYLENE SILANES AND SILOXANES

[72] Inventors: Ogden R. Pierce; Yung Ki Kim, both of Midland, Mich.

[73] Assignee: Dow Corning Corporation, Midland, Mich.

[22] Filed: Nov. 5, 1969

[21] Appl. No.: 874,411

[52] U.S. Cl. ...260/448.2 B, 260/448.2 R, 260/488 R, 260/633, 260/46.5 G, 252/49.6
[51] Int. Cl. .............C07f 7/04, C07f 7/08, C07f 7/18
[58] Field of Search..................260/448.2 B, 448.8 R

[56] References Cited

UNITED STATES PATENTS 2,966,508  12/1960  Kerschner et al. ......260/448.2 B
3,012,006  12/1961  Holbrook et al....260/448.2 B X
3,143,524   8/1964  Cooper et al.......260/448.2 B X
3,427,271   2/1969  McKellar............260/448.2 B X
3,529,003   9/1970  Rausch et al..........260/448.2 B

*Primary Examiner*—Delbert E. Gantz
*Assistant Examiner*—P. F. Shaver
*Attorney*—Robert F. Fleming, Jr., Laurence R. Hobey, Harry D. Dingman and Norman E. Lewis

[57] ABSTRACT

Fluorocompounds of the formula $CH=CH_2(CH_2CH_2)_nR_fCH_2OR$ in which $R_f$ is a perfluoroalkylene radical of no more than 18 carbon atoms and R is a hydrogen atom or acyl radical. These monomers can be polymerized with a free radical catalyst to give

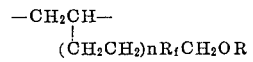

or the compounds can be reacted with $\equiv SiH$ to give the corresponding substituted silicon atom. The novel silicon containing compounds are useful as elastomers, lubricants, and coating compositions.

7 Claims, No Drawings

FLUOROALKYLENE SILANES AND SILOXANES

This invention relates to organofunctional fluoroalkylene compounds. In one aspect, the invention relates to vinyl polymers. In another aspect, the invention relates to organofunctional silicon compounds.

The novel fluoroalkylene compounds of the invention are represented by the formula $CH_2 = CH(CH_2CH_2)_nR_fCH_2OR$ in which $R_f$ is a perfluoroalkylene radical of no more than 18 carbon atoms; R is a hydrogen atom or a

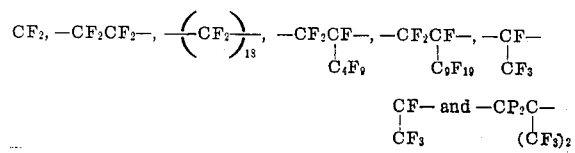

in which R' is a lower alkyl radical of no more than six carbon atoms; and $n$ is an integer having a value of from 0 to 2.

For purposes of this invention $R_f$ can be any perfluoroalkylene radical of no more than 18 carbon atoms, for example,

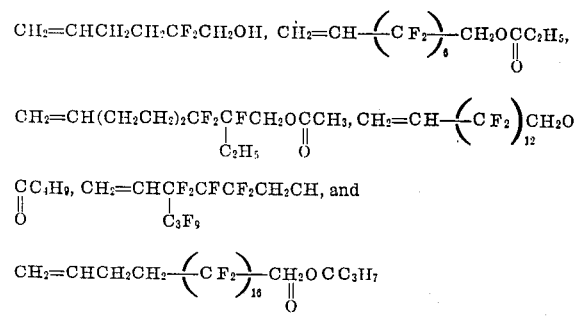

R' can be any lower alkyl radical, such as methyl, ethyl, butyl, isopropyl, t-butyl, or hexyl.

Thus, included within the scope of the invention are the following:

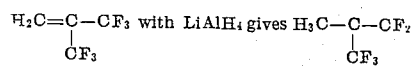

These fluoroalkylene compounds are prepared by the reduction of $CH_2 = CH(CH_2CH_2)_nR_fCOOR'$ with lithium aluminum hydride to obtain $CH_2 = CH(CH_2CH_2)_nR_fCH_2OH$, which in turn can be esterified by reaction with R'COCl. The precursors to the compounds of the invention are prepared by reacting a omega-bromo-perfluoroester with ethylene and thereafter dehydrohalogenating the resulting compound by reaction with an alkali metal alkoxide. The precursor and its preparation are described in detail in copending application Ser. No. 598,604, filed Dec. 2, 1966, now U.S. Pat. No. 3,503,645.

Fluoroolefins are known to react with the reducing agent, causing rearrangement of the double bond. For example, the reaction of

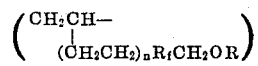

see Kaufman et al., Journal of Organic Chemistry, 32, 2749, (1967).

The unsaturated products of this invention can be polymerized via the carbon-carbon double bond to produce polymers of the unit formula $$\left( \begin{matrix} CH_2CH- \\ | \\ (CH_2CH_2)_nR_fCH_2OR \end{matrix} \right)$$

in which R, $R_f$, and $n$ are as defined above.

The polymerization of the monomer can be carried out employing free radical catalyst, for example, peroxides such as di-t-butyl peroxide, dicumyl peroxide and tertiary alkyl peroxides; azo compounds, for example, azo-bisbutyronitile; organometallic compounds, such as tetraethyl lead; and ionizing radiation, such as high speed electrons or gamma rays. The polymerization is carried out by heating the monomer in the presence of the catalyst at temperatures of from 100° to 150°C. or above until the desired degree of polymerization is obtained.

In addition, the unsaturated monomers of the invention can be copolymerized with other monomers having aliphatic carbon-carbon unsaturation. Examples of such monomers are fluorinated olefins, such as tetrafluoroethylene, perfluoropropylene and trifluoropropylene, trichloroethylene; acrylic monomers, such as methyl acrylate, methylmethacrylate, acrylic acid and butyl acrylate; vinyl monomers, such as vinylchloride, vinylidene fluoride, vinyl acetate and vinylidene chloride; olefins, such as propylene, butadiene, chlorobutadiene, isoprene, styrene alpha-methylstyrene, vinyl toluene and ethylene; unsaturated ethers, such as vinylmethylether, the monoallylether of ethylene glycol and divinyl ether; esters such as diallylphthalate and allyl acetate; amides, such as acryl amide and methacryl amide and nitriles, such as acrylonitrile and allyl cyanide.

The above copolymers can be prepared by conventional polymerization techniques. The amounts of the monomers of the invention in the copolymeric materials can vary from 0.01 to 99.99 mol percent. The copolymers are fluids, resins or elastomers, depending on the specific composition and degree of polymerization. The materials find use as lubricants, sealants, fibers, coatings and films. For example, a copolymer containing 98 mole percent propylene units and 2 mole percent

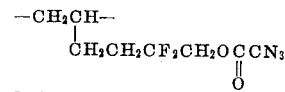

units can be melt spun to form fibers or extruded to form a film.

The fluoroalkylene compounds of the invention are also useful as intermediates in the preparation of organofunctional silicon compounds. The unsaturated compounds can be reacted with ≡ SiH compounds in the presence of a platinum catalyst to give ≡ SiCH$_2$CH$_{2br}$$^{(CH}_2$CH$_2)_n$R$_f$CH$_2$OR in which $R_f$, R and $n$ are as defined. When ≡ SiClH compounds are utilized as precursors, they must be reacted with

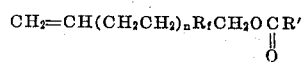

to obtain organosilicones with the ester functionality which in turn can be hydrolyzed to give ≡ SiCH$_2$CH$_2$(CH$_2$CH$_2$)$_n$R$_f$CH$_2$OH.

Thus included within the scope of the invention are silanes of the formula

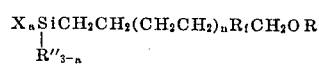

in which $R_f$, R, and n are as defined, R'' is a hydrogen atom, a monovalent hydrocarbon radical or a monovalent halohydrocarbon radical; X is a hydroxyl group or a hydrolyzable radical and a is an integer having a value of from 1 to 3.

The above described silanes can be hydrolyzed or cohydrolyzed with other silanes of the formula $Z_bSiX_{4-b}$ by hydrolysis techniques well known in the art to yield siloxane polymers consisting essentially of at least one unit of the formula

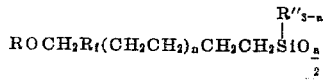

$$R O C H_2 R_f (CH_2CH_2)_n CH_2CH_2 \underset{2}{SiO_{\frac{R''_{3-a}}{a}}}$$

in which $R_f$, R, R'', n and a are as defined, any remaining units being of the formula $Z_bSiO_{(4-b)/2}$ in which Z is a hydrogen atom, a hydroxyl group, a monovalent hydrocarbon radical or a monovalent halohydrocarbon radical, and b is an integer having a value of from 0 to 3.

The siloxanes can be homopolymers or they can be copolymers having various functional fluoroalkyl-containing units in combination with $SiO_2$, $ZSiO_{3/2}$, $Z_2SiO$ and $Z_3SiO_{1/2}$ units. The same or different X, R'' and Z substituents can be attached to the same silicon atoms.

R'' can be any monovalent hydrocarbon radical such as alkyl radicals such as methyl, ethyl, propyl, isopropyl, butyl, pentyl, isopentyl, neopentyl, hexyl, octyl, dodecyl, octadecyl, 3-methylheptyl, 6-butyloctadecyl, tertiary butyl, myricyl and 2,2-diethylpentyl; alkenyl radicals such as, vinyl, allyl, hexenyl, butenyl, 3-octenyl, 4,9-octadecadienyl and 4-nonenyl; alkynyl radicals such as propynyl, heptynyl, butynyl, decynyl; alkenynyl radicals such as 1-penten-3-ynyl, 2-ethyl-1-buten-3-ynyl; cycloaliphatic radicals such as, cyclobutyl, cyclopentyl, cyclohexyl, cycloheptyl, propylcyclohexyl, 2,4-dimethylcyclopentyl, cyclohexenyl, bicyclo[3.1.0][3.2.1.1$^{3,8}$]-5-nonenyl, spiro [4.5]decyl, dispiro[4.1.4.2]1-tridecenyl, decahydronaphthyl, 2,3-dihydroindyl and 1,2,3,4-tetrahydronaphthyl; aryl radicals such as phenyl, tolyl, xylyl, 3-ethylphenyl, xenyl, naphthyl, anthracyl, pentacenyl, 3,4-methylethylphenyl, 9,9'-bifluoryl and 4-m-terphenyl; and aralkyl radicals such as 2-phenyl-octyl, 3-methyl-2-(4-isopropylphenyl)heptyl, benzyl, 2-ethyltolyl, 2-ethyl-p-cymyl, diphenylmethyl, 4,5-diphenylpentyl, 2-phenylethyl and 2-phenylpropyl.

R'' can also be any monovalent halogenated hydrocarbon group such as aliphatic groups such as chloromethyl, 3-chloropropyl, 3,3,3-trichloropropyl, perfluorovinyl, chlorooctadecyl or radicals of the formula $R_fCH_2CH_2$— where $R_f$ can be any perfluoroalkyl group such as trifluoromethyl, perfluoroethyl, perfluoroisobutyl, perfluoroheptyl or perfluorooctadecyl; aromatic groups such as dichlorophenyl, tetrabromoxenyl, tetrachlorophenyl, alpha,alpha,alpha-trifluorotolyl or iodonaphthyl; cycloaliphatic groups such as chlorocyclohexyl, bromocyclopentyl or chlorocyclohexenyl and aralkyl groups such as chlorobenzyl, beta-(chlorophenyl)ethyl or beta-(iodophenyl)ethyl or beta-(bromophenyl)propyl.

X can be any hydrolyzable group such as halogen atoms such as F, Cl, Br or I; groups of the formula —OZ when Z is any hydrocarbon or halogenated hydrocarbon group such as methyl, ethyl, isopropyl, octadecyl, allyl, hexenyl, cyclohexyl, phenyl, benzyl, beta-phenylethyl, 2-chloroethyl, chlorophenyl, 3,3,3- trifluoropropyl or bromocyclohexyl; any hydrocarbon ether radical such as 2-methoxyphenyl, 2-ethoxyisopropyl, 2-butoxyisobutyl, p-methoxyphenyl or —$(CH_2CH_2O)_2CH_3$; any acyl radical such as acetyl, propionyl, benzoyl, cyclohexoyl, acrylyl, methacrylyl, stearyl, naphthoyl, trifluoroacetyl, chlorobenzoyl or bromopropionyl; or any N,N-amino radical such as dimethylamino, diethylamino, ethylmethylamino, diphenylamino, or dicyclohexylamino. X can also be any amino radical such as $NH_2$, dimethylamino, diethylamino, methylphenylamino or dicyclohexylamino; any ketoxime radical of the formula —ON $CM_2$ or —ON CM' in which M is any monovalent hydrocarbon or halogenated hydrocarbon radical such as those shown for R'' above and M' in any divalent hydrocarbon radical both valences of which are attached to the carbon, such as hexylene, pentylene or octylene; ureido groups of the formula —N(M)CONM''$_2$ in which M is any monovalent hydrocarbon or halohydrocarbon radical such as those shown for R'' above and M'' is H or any of the M radicals; carbamate groups of the formula —OOCNMM'' in which M is any monovalent hydrocarbon radical or halogenated hydrocarbon radical as illustrated for R'' above and M'' is H or a M group, or carboxylic amide radicals of the formula —NMC=O(M'') in M is any monovalent hydrocarbon radical of halogenated hydrocarbon radical as illustrated for R'' above and M'' is H or a M radical. X can also be the sulfate group or sulfate ester groups of the formula —$OSO_2(OM)$ where M is any monovalent hydrocarbon or halogenated hydrocarbon radical as above illustrated for R'''; the cyano group; the isocyanate group; and the phosphate group or phosphate ester groups of the formula —$OPO(OM)_2$ in which M is any monovalent hydrocarbon of halogenated hydrocarbon radical as above illustrated for R''.

The term "hydrolyzable group" means any group attached to the silicon which is hydrolyzed by water at room temperature.

As described above, the Z radicals in the siloxane copolymers can be the hydrogen atom, the hydroxyl group or any of the monovalent hydrocarbons or halohydrocarbons described with respect to R''.

The siloxanes of the invention are resins, fluids, or elastomers, depending on the particular substituents on the silicon atom and the degree of polymerization. The resins find utility as coating compositions, the fluids as lubricants and the elastomers as sealants.

The following examples are illustrative and should not be construed as limiting the invention which is delineated in the claims.

EXAMPLE 1

Under a nitrogen atmosphere, 100 grams (0.5 mole) of $CH_2=CHCF_2CF_2COOC_2H_5$ was added dropwise to stirred mixture of 20 grams (0.53 mole) of $LiAlH_4$ and 400 milliliters of dry ether. During the addition, the temperature was maintained at from 0° to 5°C. After completion of the addition, the reaction mixture was heated at reflux temperature for 3.5 hours. The excess $LiAlH_4$ was decomposed by dropwise addition of about 100 milliliters of water. Addition of the water was carried out at from 0° to 5°C. The reaction mixture was then acidified with dilute hydrochloric acid and poured into about 500 milliliters of ice water. The ether layer was separated and dried. After evaporation of the ether, the reaction mixture was distilled to give 68.5 grams of $CH_2=CHCF_2CF_2CH_2OH$, having a boiling point of 135°C.

The $F^{19}$ and $H^1$ resonance spectra were in agreement with the depicted alcohol structure.

EXAMPLE 2

Into a stirred solution of 100 grams (0.63 mole) of $CH_2=CHCF_2CF_2CH_2OH$ and 77 grams (0.76 mole) of triethyl amine in 300 milliliters of dry ether, there was added dropwise 60 grams (0.76 mole) of acetyl chloride. The addition was carried out at from 0° to 5°C. After completion of the addition, the reaction mixture was heated at mild reflux for several hours while stirring. The salt was removed by filtration and, after removal of the ether, the filtrate was distilled to yield 110 grams of

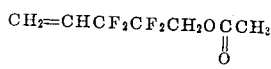

having a boiling point of 62°C./18 mm Hg. All spectral properties were in agreement with the assigned structure.

EXAMPLE 3

When the product of Example 3 is mixed with di-t-butyl peroxide and heated to a temperature in the range of 125°–150°C., polymers of the following unit structure are obtained:

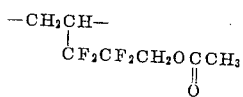

EXAMPLE 4

When the ester,

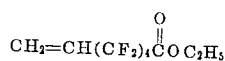

is copolymerized with $CH_2=CH(CH_2CH_2)_2(CF_2)_4CH_2OH$ in amounts of 50 mol percent of each by heating a mixture of the two with di-t-butyl peroxide at 125°C.; a copolymer of units of the formulas

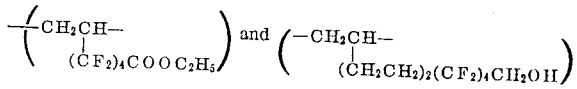

is obtained.

EXAMPLE 5

When equimolar amounts of styrene and

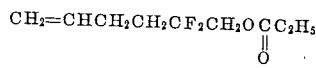

are copolymerized by heating a mixture of the monomers at 100°C. in the presence of benzoyl peroxide, a copolymer of units of the formulas

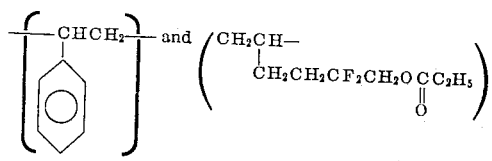

EXAMPLE 6

Under a nitrogen atmosphere, 110 grams (0.63 mole) of (3,3,3-trifluoropropyl)methylchlorosilane was added dropwise to a stirred mixture of 100 grams (0.5 mole) of

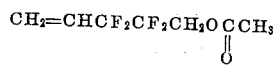

and 0.3 milliliter of a 0.1 molar solution of chloroplatinic acid in isopropyl alcohol. During the addition the temperature was maintained at 110°C. The reaction mixture was then heated at reflux temperature for 17 hours. Distillation of the reaction mixture gave 118 grams (63 percent yield) of pure

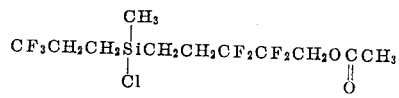

having a boiling point of 94°C./0.25 mm Hg. and a refractive index of 1.3925. The spectral properties of the product were consistent with the assigned structure.

Upon heating a mixture of

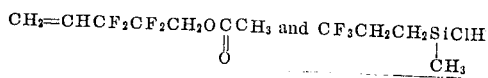

in the presence of a catalytic amount of di-t-butyl peroxide at reflux temperatures for about 16 hours, the above-described product was obtained.

EXAMPLE 7

Following the procedure described in Example 6, the reaction of

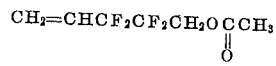

with methyldichlorosilane in the presence of chloroplatinic acid yielded

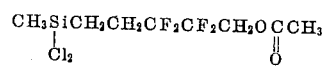

having a boiling point of 87°C./1.25 mm Hg. and a refractive index of 1.4145.

This same procedure gave

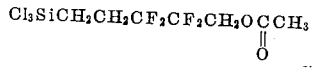

(boiling point of 92°C./0.75 mm Hg.) when $Cl_3SiH$ was reacted with the 2,2,3,3-tetrafluoro-3-(vinyl)propyl acetate.

EXAMPLE 8

A solution of 10 grams (0.026 mole) of

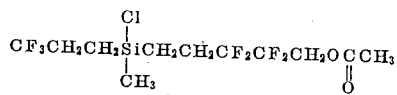

in 15 milliliters of methanol was heated at reflux for 2 hours, after which the methanol and low boiling materials were removed by fractional distillation. The high boiling product was distilled under vacuum to yield 6.2 grams of

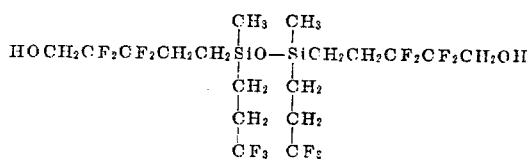

having a boiling point of 225°C./0.5 mm Hg. and a refractive index of 1.3925. The $F^{19}$ and $H^1$ resonance spectra were in agreement with the assigned structure. This polymer had a viscosity of 300–500 cs. and was suitable for use as a lubricant.

EXAMPLE 9

The dichloro product of Example 7,

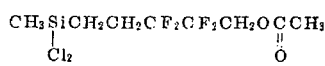

was hydrolyzed in an aqueous sodium bicarbonate-ether solution at room temperature. The hydrolyzate was condensed by the addition of tetramethyl guanidine-acetic anhydride and heating at 125°C./15 mm Hg. for 24 hours to give a viscous fluid polymer of units of the formula

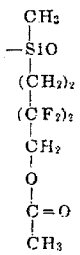

which can be compounded with a filler, such as silica, to form a sealant.

Further modification and variation are within the scope of the invention which relates to fluoroethylene compounds and polymer products.

That which is claimed is:

1. Organosilicon compounds of the formula

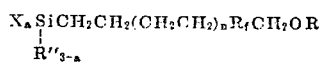

in which, $R_f$ is a perfluoroalkylene radical of no more than 18 carbon atoms,

X is a hydroxyl group or hydrolyzable radical;

R is the hydrogen atom or a

radical in which R' is a lower alkyl radical of no more than six carbon atoms;

$n$ is an integer having a value of from 0 to 2,

R'' is a hydrogen atom, a monovalent hydrocarbon radical or a monovalent halohydrocarbon radical; and $a$ is an integer having a value of from 1 to 3.

2. The compound of claim 1 in which X is a chlorine atom.

3. The compound of claim 1 in which R is a

radical.

4. A compound in accordance with claim 1 of the formula

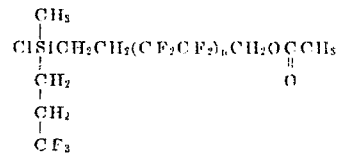

5. A siloxane consisting essentially of at least one unit of the formula

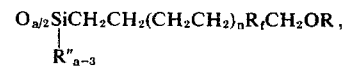

in which

R is the hydrogen atom or a

radical in which R' is a lower alkyl radical of no more than six carbon atoms;

$n$ is an integer having a value of from 0 to 2,

R'' is a hydrogen atom, a monovalent hydrocarbon radical or a monovalent halohydrocarbon radical; and $a$ is an integer having a value of from 1 to 3, any remaining units being of the formula $Z_bSiO_{(4-b)/2}$, in which Z is a hydrogen atom, a hydroxyl group, a monovalent hydrocarbon radical or a monovalent halohydrocarbon radical; and $b$ is an integer having a value of from 0 to 3.

6. The siloxane of claim 5 consisting essentially of

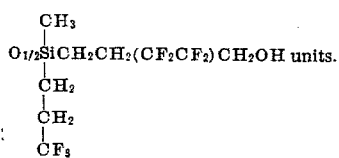

7. The siloxane of claim 5 consisting essentially of units of the formula

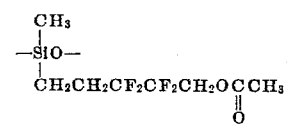

* * * * *